United States Patent
Li et al.

(10) Patent No.: US 10,893,512 B2
(45) Date of Patent: Jan. 12, 2021

(54) RESOURCE ELEMENT (RE) ALLOCATION FOR UPLINK CONTROL INFORMATION (UCI) ON PHYSICAL UPLINK SHARED CHANNEL (PUSCH)

(71) Applicant: MEDIATEK INC., Hsinchu (TW)

(72) Inventors: Xiu-Sheng Li, Hsinchu (TW); Chia-Hua Lin, Hsinchu (TW); Guo-Hau Gau, Hsinchu (TW); Ju-Ya Chen, Hsinchu (TW)

(73) Assignee: MediaTek INC., Hsin-Chu (TW)

( * ) Notice: Subject to any disclaimer, the term of this patent is extended or adjusted under 35 U.S.C. 154(b) by 71 days.

(21) Appl. No.: 15/843,274

(22) Filed: Dec. 15, 2017

(65) Prior Publication Data

US 2018/0206225 A1   Jul. 19, 2018

Related U.S. Application Data

(60) Provisional application No. 62/446,576, filed on Jan. 16, 2017.

(51) Int. Cl.
*H04W 72/04* (2009.01)
*H04W 88/02* (2009.01)
(Continued)

(52) U.S. Cl.
CPC ....... *H04W 72/0413* (2013.01); *H04L 1/1671* (2013.01); *H04L 1/1812* (2013.01);
(Continued)

(58) Field of Classification Search
CPC combination set(s) only.
See application file for complete search history.

(56) References Cited

U.S. PATENT DOCUMENTS

| 10,142,074 B2 * | 11/2018 | Wang .................. H04L 27/2613 |
| 2011/0013615 A1 | 1/2011 | Lee et al. ....................... 370/344 |

(Continued)

FOREIGN PATENT DOCUMENTS

| CN | 104301082 A | 7/2009 |
| WO | WO2016144243 A1 | 3/2015 |

OTHER PUBLICATIONS

EPO, Search Report for the EP patent application 18151620.4 dated Jun. 15, 2018 (10 pages).

(Continued)

*Primary Examiner* — Yee F Lam
(74) *Attorney, Agent, or Firm* — Imperium Patent Works; Zheng Jin (57) ABSTRACT

Apparatus and methods are provided for RE allocation for UCI on PUSCH. In one novel aspect, the UE encodes UCI for transmission on PUSCH in a NR network. The UE allocates UCI REs onto the PUSCH following one or more UCI RE allocation rules including (a) using same logical allocation patterns for both CP-OFDM waveforms and DFT-S-OFDM waveforms, (b) distributing the UCI REs across a time domain of the PUSCH, and (c) distributing the UCI REs across a frequency domain for CP-OFDM or across a virtual-time domain for DFT-S-OFDM. In one embodiment, the HARQ-ACK REs are distributed across the time domain as much as possible. In another embodiment, the allocation of the HARQ-ACK REs further involves calculating the number of HARQ REs dynamically for the HARQ ACK. The number of HARQ REs is based on a weighting parameter, which is either configured or obtained through system information.

17 Claims, 8 Drawing Sheets

(51) Int. Cl.
  *H04W 88/08* (2009.01)
  *H04L 1/18* (2006.01)
  *H04L 5/00* (2006.01)
  *H04L 1/16* (2006.01)
  *H04L 27/26* (2006.01)

(52) U.S. Cl.
  CPC .......... *H04L 1/1861* (2013.01); *H04L 5/0007* (2013.01); *H04L 5/0053* (2013.01); *H04W 72/044* (2013.01); *H04L 27/2634* (2013.01); *H04W 88/02* (2013.01); *H04W 88/08* (2013.01)

(56) References Cited

U.S. PATENT DOCUMENTS

| | | | | |
|---|---|---|---|---|
| 2015/0029968 | A1* | 1/2015 | Park | H04L 5/0012 370/329 |
| 2016/0021653 | A1* | 1/2016 | Papasakellariou | H04L 5/0057 370/329 |
| 2016/0337954 | A1* | 11/2016 | Gulati | H04W 76/14 |
| 2017/0311296 | A1* | 10/2017 | Onggosanusi | H04B 7/0404 |
| 2018/0049173 | A1* | 2/2018 | Chen | H04W 72/044 |
| 2018/0097594 | A1* | 4/2018 | Wang | H04L 5/0048 |
| 2018/0131418 | A1* | 5/2018 | Wang | H04B 7/0417 |
| 2018/0132269 | A1* | 5/2018 | Wang | H04W 52/365 |
| 2018/0167933 | A1* | 6/2018 | Yin | H04L 5/0055 |
| 2018/0175993 | A1* | 6/2018 | Onggosanusi | H04W 72/06 |
| 2018/0176902 | A1* | 6/2018 | Huang | H04L 5/0094 |
| 2018/0183503 | A1* | 6/2018 | Rahman | H04W 72/042 |
| 2018/0184447 | A1* | 6/2018 | Wang | H04W 74/004 |
| 2018/0192416 | A1* | 7/2018 | Yin | H04L 1/1607 |
| 2018/0192417 | A1* | 7/2018 | Yin | H04L 5/005 |
| 2018/0198657 | A1* | 7/2018 | Aiba | H04W 28/18 |
| 2018/0205528 | A1* | 7/2018 | Bai | H04L 5/0005 |
| 2018/0206196 | A1* | 7/2018 | Wang | H04W 52/225 |
| 2018/0279291 | A1* | 9/2018 | Tiirola | H04B 1/713 |
| 2018/0338303 | A1* | 11/2018 | Jia | H04L 67/12 |

OTHER PUBLICATIONS

3GPP TSG RAN WG1 NR Ad-Hoc Meeting R1-1700953, Samsung, "UCI and Data Multiplexing", Spokane, USA dated Jan. 16-20, 2017 (5 pages).
3GPP TSG RAN WG1 NR Ad-Hoc Meeting R1-1700199, CATT, "Short PUCCH structure", Spokane, USA dated Jan. 16-20, 2017 (5 pages). p. 1-p. 3.
3GPP TSG RAN WG1 #NR R1-1701016, Nokia et al., "UCI multiplexing in the presence of UL data", Spokane, USA dated Jan. 16-20, 2017 (3 pages). p. 1-p. 2.
3GPP TSG-RAN WG1 Meeting #86b R1-1609535, Intel Corp., "UCI embedding onto UL shared channel", Lisbon, Portugal dated Oct. 10-14, 2016 (3 pages).
Taiwan Patent Office search report and opinion for application 107101217, dated Sep. 17, 2018 (6 pages).
3GPP TSG RAN WG1 Meeting #86bis R1-1609887, Lisbon, Portugal Oct. 10-14, 2016, Title "Coexistence of CP OFDM and CP DFT-s-OFDM for NR UL".
EPO, search report for the EP patent application 18151620.4 dated Jun. 3, 2019 (7 pages).
SIPO, search report for the CN patent application 201810041012.7 (no English translation is available) dated Jun. 17, 2020 (12 pages).
Samsung, R1-1700953 3GPP TSG RAN WG1 NR Ad-Hoc Meeting, "UCI and Data Multiplexing", Spokane, USA dated Jan. 16-20, 2017 (5 pages).
Intel Corporation, R1-1609535 3GPP TSG-RAN WG1 Meeting #86b, "UCI embedding onto UL shared channel", Lisbon, Portugal dated Oct. 10-14, 2016 (3 pages).
Catt, R1-1700199 3GPP TSG RAN WG1 NR Ad-Hoc Meeting, "Short PUCCH structure", Spokane, USA dated Jan. 16-20, 2017 (5 pages).
Nokia et al., R1-1701016 3GPP TSG RAN WG1 #NR, "UCI multiplexing in the presence of UL data", Spokane, WA, USA dated Jan. 16-20, 2017 (3 pages).

* cited by examiner

RESOURCE ELEMENT (RE) ALLOCATION FOR UPLINK CONTROL INFORMATION (UCI) ON PHYSICAL UPLINK SHARED CHANNEL (PUSCH)

CROSS REFERENCE TO RELATED APPLICATIONS

This application claims priority under 35 U.S.C. § 119 from U.S. Provisional Application No. 62/446,576 entitled "RE ALLOCATION FOR UCI ON PUSCH" filed on Jan. 16, 2017, the subject matter of which is incorporated herein by reference.

TECHNICAL FIELD

The disclosed embodiments relate generally to wireless communication, and, more particularly, to resource element (RE) allocation in uplink control information (UCI) on physical uplink shared channel (PUSCH).

BACKGROUND

Third generation partnership project (3GPP) and Long Term Evolution (LTE) mobile telecommunication systems provide high data rate, lower latency and improved system performances. With the increasing demand for higher system capacity, radio access technology (RAT) is one area for improvement. The new radio access ("NR") is developed for the next generation wireless system. The uplink control information (UCI) on PUSCH is supported in the LTE network. UCI on PUSCH is also supported in the NR network. When UCI is transmitted on PUSCH, some UCI puncture the UL shared data. Therefore, the allocation of the UCI REs is designed to balance punctured bits of each code block. In addition, LTE network supports only directed fast Fourier spread (DFT-S) OFDM waveforms. The NR network supports both the DFT-S-OFDM and the cyclic prefix (CP)-OFDM.

Improvements and enhancements are required for UCI RE on the PUSCH for the NR network.

SUMMARY

Apparatus and methods are provided for RE allocation for UCI on PUSCH. In one novel aspect, the UE encodes UCI for transmission on PUSCH in a NR network. The UE allocates UCI REs onto the PUSCH following one or more UCI RE allocation rules. In one embodiment, the UCI RE allocation rules include (a) using same logical allocation patterns for both CP-OFDM waveforms and DFT-S-OFDM waveforms, (b) distributing the UCI REs across a time domain of the PUSCH, and (c) distributing the UCI REs across a frequency domain for CP-OFDM or across a virtual-time domain for DFT-S-OFDM. In one embodiment, the HARQ-ACK REs are distributed across the time domain as much as possible. In another embodiment, the allocation of the HARQ-ACK REs further involves calculating a number of HARQ REs dynamically for the HARQ ACK, generating encoded bits and subsequently modulated symbols based on the number HARQ REs, and allocating the modulated symbols on HARQ REs. In one embodiment, the number of HARQ REs is based on a weighting parameter. In one embodiment, the weighting parameter for HARQ-ACK is obtained through configuration. In another embodiment, the weighting parameter for HARQ-ACK is dynamically obtained through system information.

This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
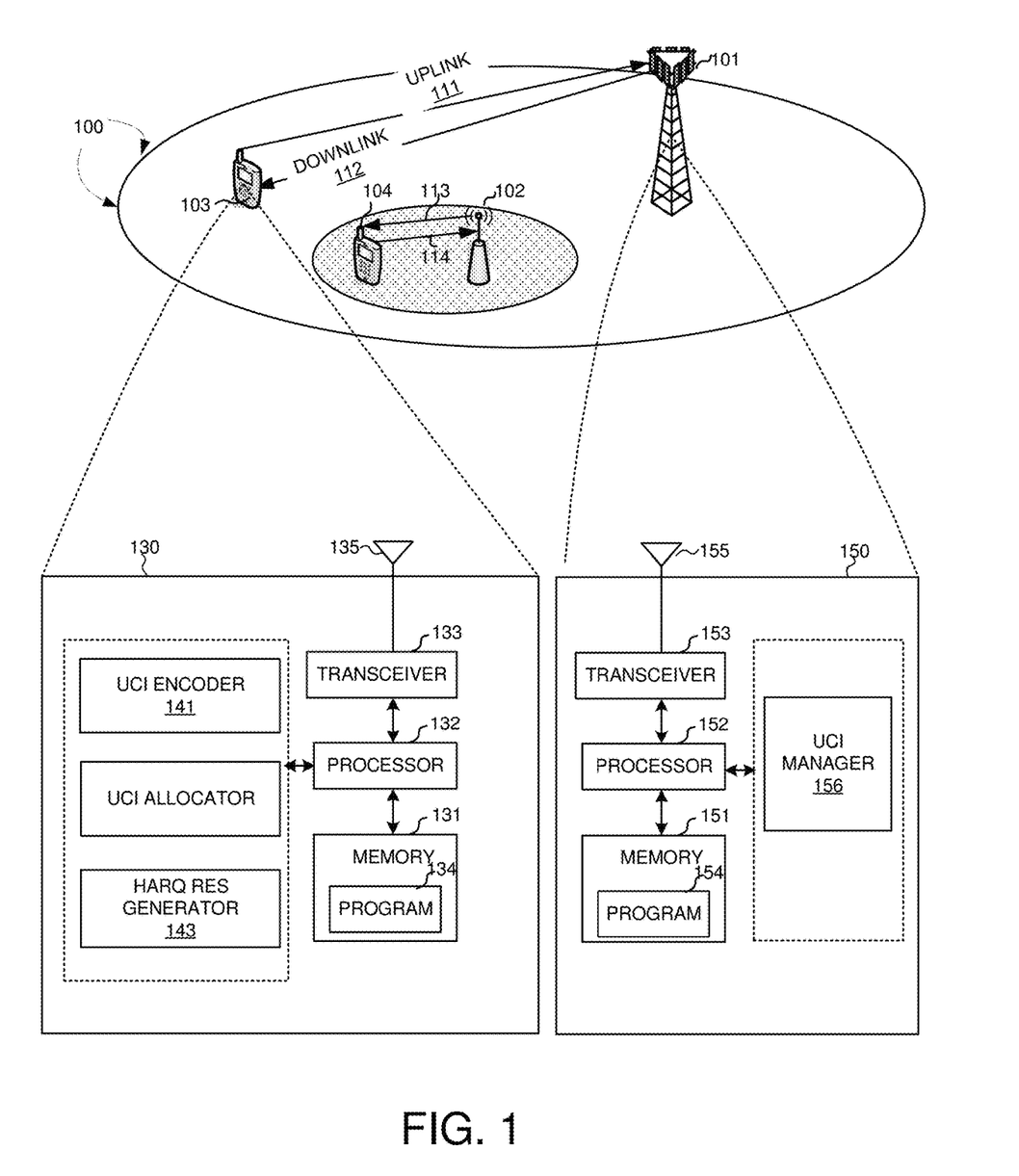
FIG. 1 is a schematic system diagram illustrating an exemplary NR wireless network with UCI on the PUSCH in accordance with embodiments of the current invention.

FIG. 1 is a schematic system diagram illustrating an exemplary NR wireless network with UCI on the PUSCH in accordance with embodiments of the current invention. Wireless communication system includes one or more fixed base infrastructure units forming a network distributed over a geographical region. The base unit may also be referred to as an access point, an access terminal, a base station, a Node-B, an eNode-B (eNB), or by other terminology used in the art. In FIG. 1, the one or more base stations 101 and 102 serve several remote units/user equipment (UEs) 103 and 104 within a serving area, for example, a cell, or within a cell sector. In some systems, one or more base stations are communicably coupled to a controller forming an access network that is communicably coupled to one or more core networks. The disclosure, however, is not intended to be limited to any particular wireless communication system.

Generally, serving base stations 101 and 102 transmit downlink communication signals 112 and 113 to UEs or mobile stations in the time and/or frequency domain. UEs or mobile stations 103 and 104 communicate with one or more base stations 101 and 102 via uplink communication signals 111 and 114. UE or the mobile station may also be referred to as a mobile phone, laptop, and mobile workstation and so on. In FIG. 1, the wireless communication system 100 is an OFDM/OFDMA system comprising a base station eNB 101 eNB 102 and a plurality of UE 103 and UE 104. When there is a downlink packet to be sent from the eNB to the UE, each UE gets a downlink assignment, e.g., a set of radio resources in a physical downlink shared channel (PDSCH). When a UE needs to send a packet to eNB in the uplink, the UE gets a grant from the eNB that assigns a physical uplink shared channel (PUSCH) consisting of a set of uplink radio resources. The UE gets the downlink or uplink scheduling information from a new RAT physical downlink control channel (NR-PDCCH), which is targeted specifically to new RAT UEs/mobile stations and has similar functionalities as legacy PDCCH, EPDCCH and MPDCCH. The downlink or uplink scheduling information and the other control information, carried by NR-PDCCH, is referred to as downlink control information (DCI). In one novel aspect, improved RE allocations are provided for UCI RE transported on PUSCH in the NR network. UCI includes HARQ, scheduling request (SR), channel status information (CSI). In the NR network, some UCIs, such as HARQ, may puncture the UL data on the PUSCH.

FIG. 1 further illustrates simplified block diagrams 130 and 150 for UE 103 and eNB 101, respectively. UE 103 has an antenna 135, which transmits and receives radio signals. A RF transceiver module 133, coupled with the antenna, receives RF signals from antenna 135, converts them to baseband signals and sends them to processor 132. RF transceiver 133 also converts received baseband signals from processor 132, converts them to RF signals, and sends out to antenna 135. Processor 132 processes the received baseband signals and invokes different functional modules to perform features in UE 103. Memory 131 stores program instructions and data 134 to control the operations of UE 103.

UE 103 also includes multiple function modules that carry out different tasks in accordance with embodiments of the current invention. An uplink control information (UCI) encoder 141 encodes UCI for transmission on a physical uplink shared channel (PUSCH). An UCI allocator 142 allocates UCI resource elements (REs) on the PUSCH, wherein the UCI REs are allocated following at least one of allocation rules comprising: (a) using same logical allocation patterns for different types of UCI REs, (b) distributing the UCI REs across a time domain of the PUSCH, and (c) distributing the UCI REs across a frequency domain for cyclic prefix orthogonal frequency-division multiplexing (CP-OFDM) or across a virtual-time domain for Discrete-Fourier-Transform spread (DFT-S) OFDM. A HARQ REs generator 143 calculates a number of HARQ REs dynamically for the HARQ ACK, generates encoded bits and subsequently modulated symbols based on the number HARQ REs, and allocates the modulated symbols on HARQ REs.

Also shown in FIG. 1 is exemplary block diagram for eNB 101. eNB 101 has an antenna 155, which transmits and receives radio signals. A RF transceiver module 153, coupled with the antenna, receives RF signals from antenna 155, converts them to baseband signals, and sends them to processor 152. RF transceiver 153 also converts received baseband signals from processor 152, converts them to RF signals, and sends out to antenna 155. Processor 152 processes the received baseband signals and invokes different functional modules to perform features in eNB 101. Memory 151 stores program instructions and data 154 to control the operations of eNB 101. eNB 101 also includes function modules that carry out different tasks in accordance with embodiments of the current invention. An UCI manager 156 performs functions to support RE allocations on PUSCH in the NR network.

LTE supports UCI on PUSCH. The REs for UL-SCH in PUSCH follows time-first rule, where the REs are allocated one by one in sequence in the time domain. In the NR network, both the DFT-S-OFDM and CP-OFDM are supported. The RE allocation for UL-SCH in NR is different than LTE. Therefore, new RE allocation rules are desired.

Figure 2:
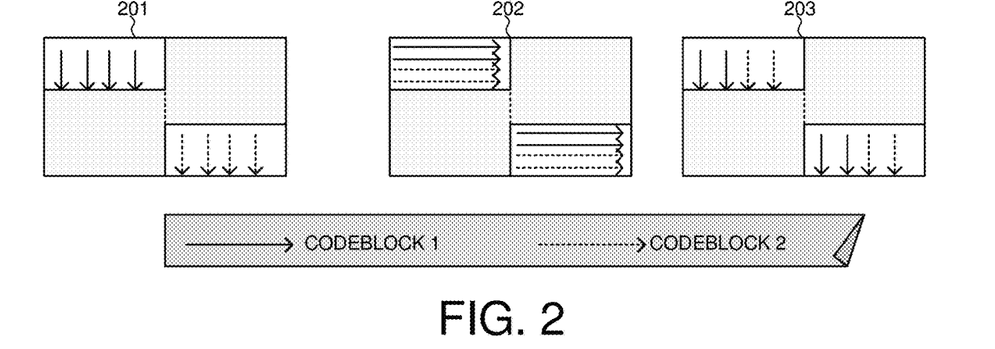
FIG. 2 illustrates different RE allocation methods for UL-SCH in accordance with embodiments of the current invention.

FIG. 2 illustrates different RE allocation methods for UL-SCH in accordance with embodiments of the current invention. Diagram 201 illustrates the frequency-first RE allocation rule. The REs are allocated starting from the lower frequency to the higher frequency one RE by one RE in sequence. Alternatively, the REs are allocated starting from the higher frequency to the lower frequency one RE by one RE in sequence. Codeblock1 and codeblock2 occupies different frequencies for frequency hopping. Diagram 202 illustrates the time-first RE allocation rule. The REs are allocated one by one in the time domain in sequence. Diagram 203 illustrates a third RE allocation rule where the REs are allocated in the frequency domain with codeblock1 and codeblock2 each occupying different frequencies for frequency hopping. For UL-SCH, the LTE uses the time-first rule. The NR network follows the frequency-first rule for UL-SCH RE allocation for CP-OFDM waveforms and DFT-S-OFDM.

Uplink control information is transmitted in Physical Uplink Control Channel (PUCCH) or transmitted with or without a transport block in PUSCH. UCI includes HARQ, scheduling request (SR), channel status information (CSI). When transmitting UCI through PUSCH, some UCIs, such as HARQ-ACK, may puncture the UL-SCH data. To balance the punctured bits of each code block, different allocation rules should apply for different system.

Figure 3:
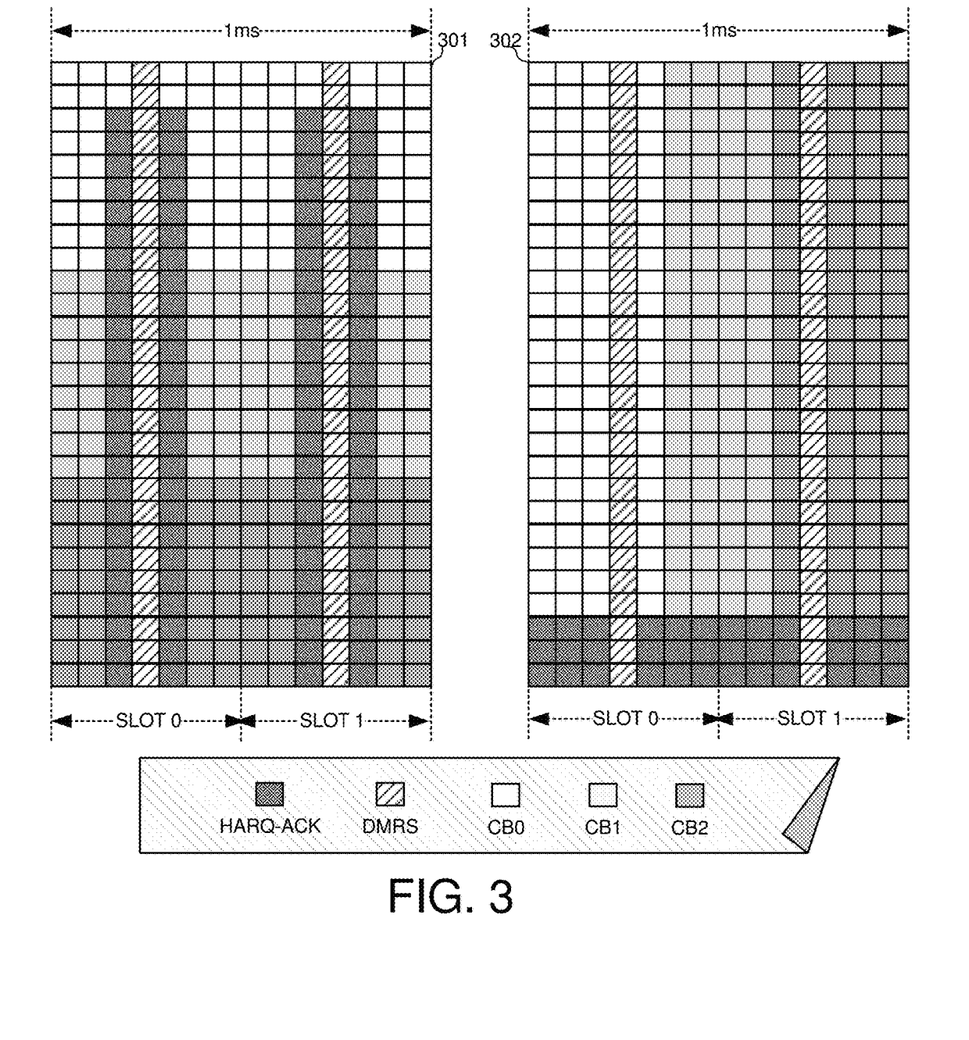
FIG. 3 illustrates exemplary diagrams for HARQ-ACK RE allocation on PUSCH for different UL-SCH RE allocation rules in accordance with embodiments of the current invention.

FIG. 3 illustrates exemplary diagrams for HARQ-ACK RE allocation on PUSCH for different UL-SCH RE allocation rules in accordance with embodiments of the current invention. Diagram 301 shows an exemplary HARQ-ACK RE allocation for the PUSCH applying time-first RE allocation rule. Three code blocks CB0, CB1, and CB2 are allocated one RE by one RE in the time domain first. To balance punctured bits of each code block, especially when there is large HARQ-ACK puncturing, the HARQ-ACK REs are distributed in the frequency domain to avoid one code block being hit too heavily. Diagram 302 shows an exemplary HARQ-ACK RE allocation for the PUSCH applying frequency-first RE allocation rule. The frequency-first RE allocation is more popular, especially for the NR network. Three code blocks CB0, CB1, and CB2 are allocated one RE by one RE in the frequency domain first. To balance punctured bits of each code block, especially when there is large HARQ-ACK puncturing, the HARQ-ACK REs are distributed across the time domain as much as possible.

In the NR network, UCI may include scheduling request (SR), rank indicator (RI), channel quality indicator (CQI), HARQ-ACK, and CSI. In theory, different types of UCIs may be allocated separately with different RE allocation rules. In one embodiment, the UE follows an UCI RE allocation rule (a) using same logical allocation patterns for both CP-OFDM waveforms and DFT-S-OFDM waveforms, (b) distributing the UCI REs across a time domain of the PUSCH, and (c) distributing the UCI REs across a frequency domain for CP-OFDM or across a virtual-time domain for DFT-S-OFDM.

Figure 4:
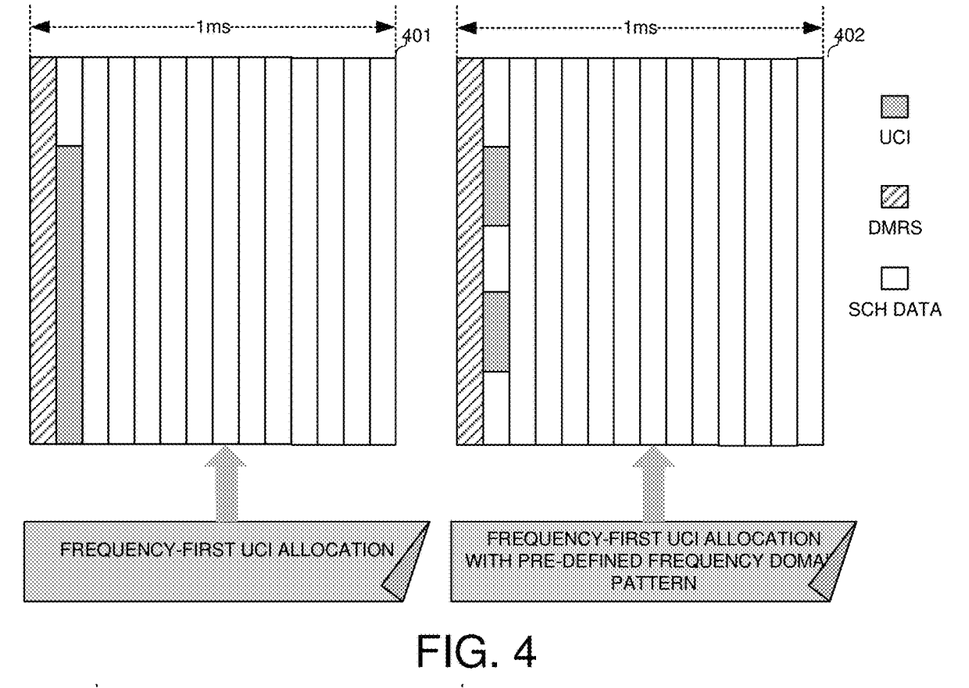
FIG. 4 illustrates exemplary diagrams for frequency-first UCI RE allocation in accordance with embodiments of the current invention.

FIG. 4 illustrates exemplary diagrams for frequency-first UCI RE allocation in accordance with embodiments of the current invention. Diagram 401 illustrates a frequency-first rule for UCI RE allocation. The UCI REs start from lower frequency to higher frequency, one RE by one RE. Alternatively, the UCI REs start from higher frequency to lower frequency, one RE by one RE. The UCI REs are distributed across the frequency domain. Diagram 402 illustrates a variation of the frequency-first rule. The UCI RE are allocated across the frequency domain first one RE by one RE. The RE distribution on the frequency domain is a patterned distribution. The pattern of the RE distribution on the frequency domain is predefined or configured.

Figure 5:
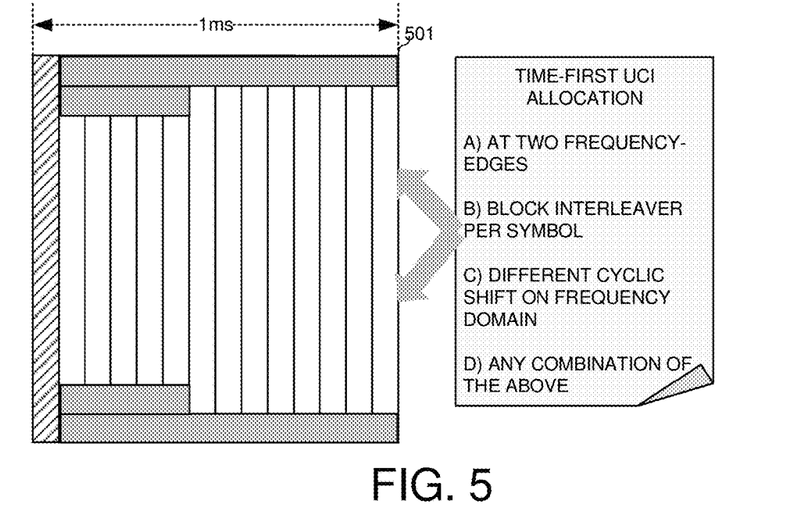
FIG. 5 illustrates exemplary diagrams for time-first UCI RE allocation in accordance with embodiments of the current invention.

FIG. 5 illustrates exemplary diagrams for time-first UCI RE allocation in accordance with embodiments of the current invention. Diagram 501 illustrates an exemplary time-first UCI RE allocation. The UCI REs are distributed across the time domain as much as possible. The UCI REs are further distributed on the frequency domain selecting a frequency diversity rule. In one embodiment (A), the UCI RE are allocated across the time domain and distributed at the two frequency edges. In one embodiment (B), the UCI RE are allocated across the time domain and subsequently, the blocks are interleaved per symbol applied. In one embodiment (C), the UCI RE are allocated across the time domain and different cyclic shift on the frequency domain is applied for different symbols. In one embodiment (D), the UCI RE are allocated across the time domain and any combination of (A), (B) and/or (C) applies.

Figure 6A:
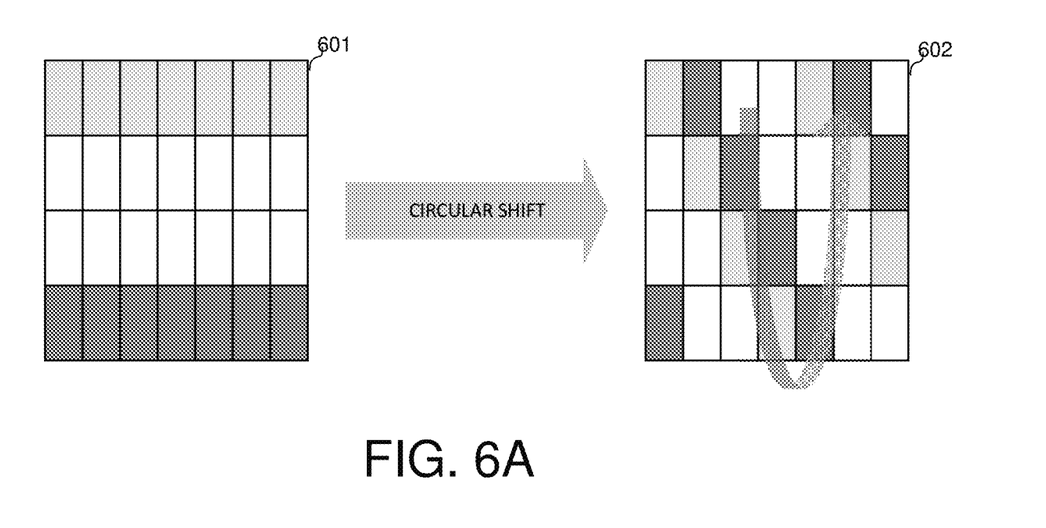
FIG. 6A illustrates an exemplary diagram of a circular cyclic shift on the frequency domain for UCI RE allocation following time-first rule.

FIG. 6A illustrates an exemplary diagram of a circular cyclic shift on the frequency domain for UCI RE allocation following time-first rule. Diagram 601 shows a logical allocation of UCI REs distributed across the time domain. The UCI REs are at the edges of the frequency domain. Diagram 602 illustrates a further distribution on the frequency domain using the circular shift. The UCI REs in diagram 601 performs a circular shift. The UCI REs are fully distributed across the time and the UCI REs are circularly shifted for further frequency diversity.

Figure 6B:
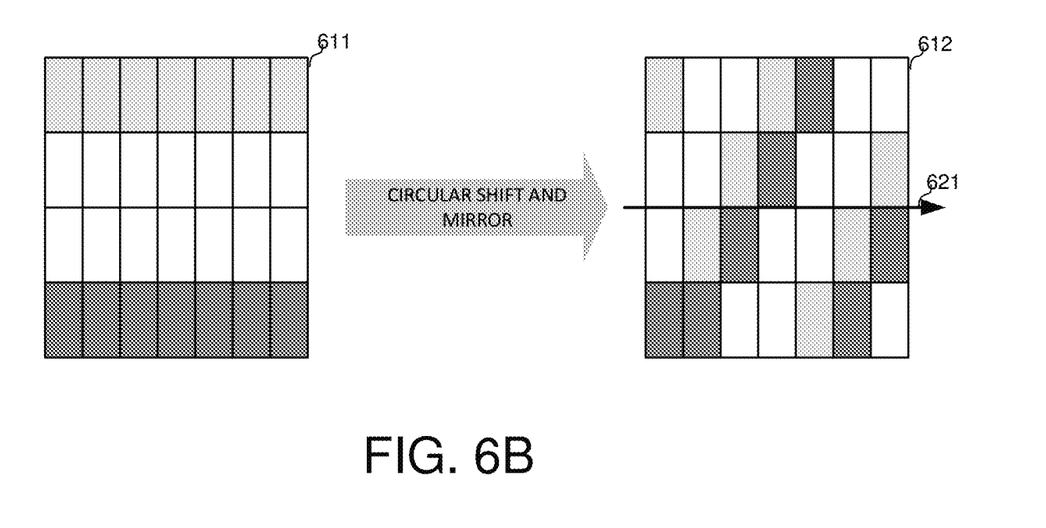
FIG. 6B illustrates an exemplary diagram of a circular cyclic shift and mirror on the frequency domain for UCI RE allocation following time-first rule.

FIG. 6B illustrates an exemplary diagram of a circular cyclic shift and mirror on the frequency domain for UCI RE allocation following time-first rule. Diagram 611 shows a logical allocation of UCI REs distributed across the time domain. The UCI REs are at the edges of the frequency domain. Diagram 612 illustrates a further distribution on the frequency domain using the circular shift and mirror. The UCI REs in diagram 601 performs a circular shift and mirror against the mirror axis 621. The UCI REs are fully distributed across the time and the UCI REs are circularly shifted for further frequency diversity.

Figure 7:
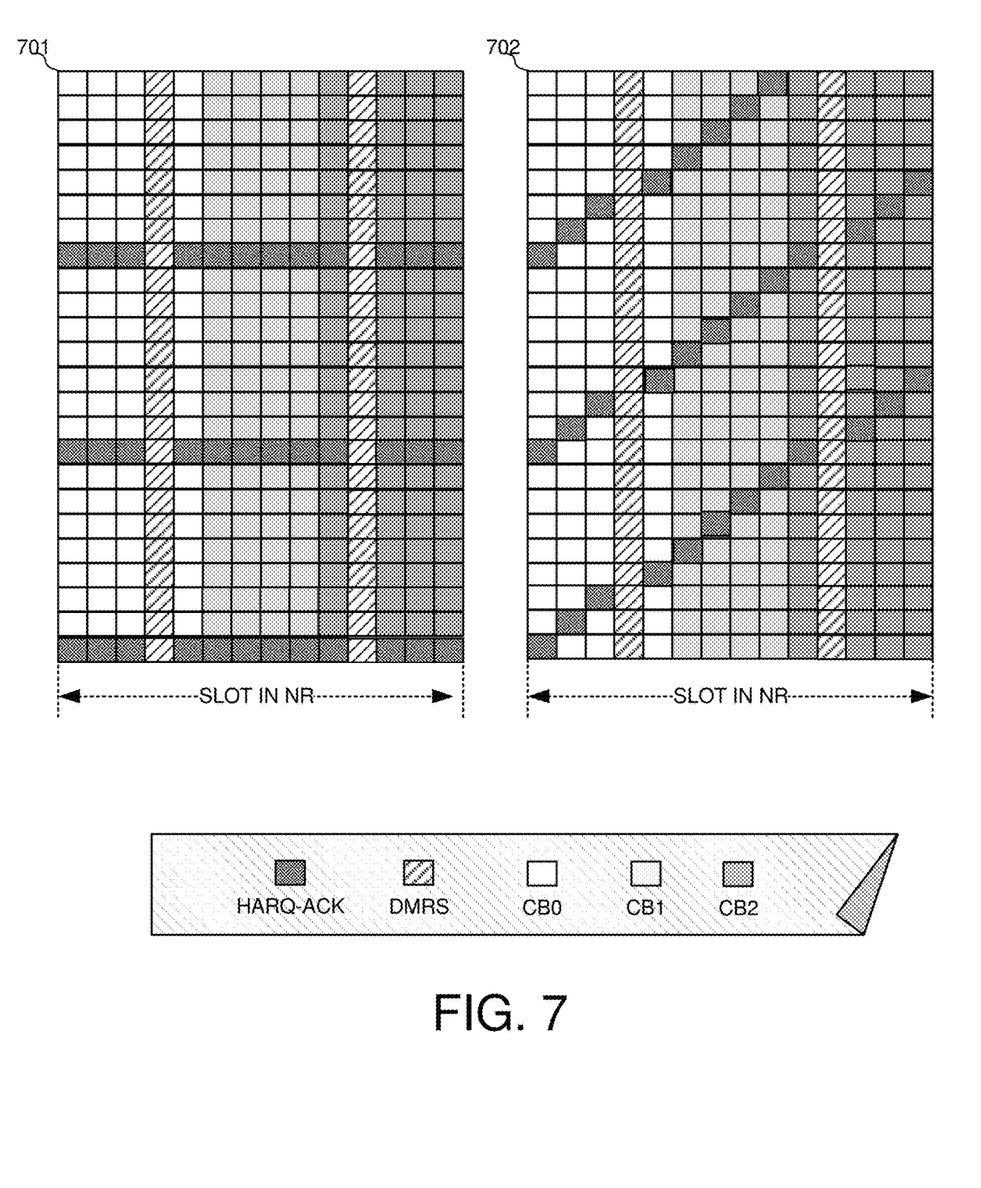
FIG. 7 illustrates exemplary diagrams for HARQ-ACK RE allocation with further frequency diversity in accordance with embodiments of the current invention.

Since HARQ-ACK punctures the UL-SCH data as well as to obtain frequency diversity. FIG. 7 illustrates exemplary diagrams for HARQ-ACK RE allocation with further frequency diversity in accordance with embodiments of the current invention. In the NR network, both CP-OFDM and the DFT-S-OFDM are supported. Therefore, a unified solution of HARQ-ACK allocation for both the CP-OFDM and DFT-S-OFDM is preferred. Since the DFT is going to further implement frequency diversity, the RE allocation patterns before the DFT in the DFT-S-OFDM should be the same for the CP-OFDM. Secondly, the HARQ-ACK REs should be across the time domain as much as possible. Thirdly, the HARQ-ACK REs should distribute the UCI REs across a frequency domain for CP-OFDM or across a virtual-time domain for DFT-S-OFDM. In general, any combination of the above rules can be used by the UE.

Diagram 701 illustrates one pattern of frequency diversity where the HARQ-REs are evenly distributed across the frequency domain. Diagram 702 illustrates one pattern of frequency diversity where the HARQ-REs further disturbed across the entire frequency domain. In one embodiment, the HARQ-RE allocation further involves dynamically calculating the number of HARQ-ACK REs, generating encoded bits based on the calculated number of HARQ-REs and subsequently modulating symbols and allocating the modulated symbols on REs following HARQ-ACK RE allocation rules.

In one embodiment, the number of HARQ-REs is proportional the number of OFDM symbols excluding DMRS symbols and the equivalent number of subcarrier for HARQ-ACK. In one embodiment, the equivalent number of subcarrier for HARQ-ACK is related the number of information bits of HARQ-ACK, the number of information bits of UL data, a weighting parameter for HARQ-ACK, and the number of total REs not including REs in the DMRS symbol. In one embodiment, the weighting parameter for HARQ-ACK is obtained through configuration. In another embodiment, the weighting parameter for HARQ-ACK is dynamically obtained through system information. In one embodiment, the HARQ-ACK RE allocation follows one or two rules. The HARQ-ACK RE allocation rules include evenly distribute the equivalent number of subcarriers for HARQ-ACK, and additional shift per OFDM symbol. The modulated symbols can be allocated by either frequency-first or time-first rules.

Figure 8:
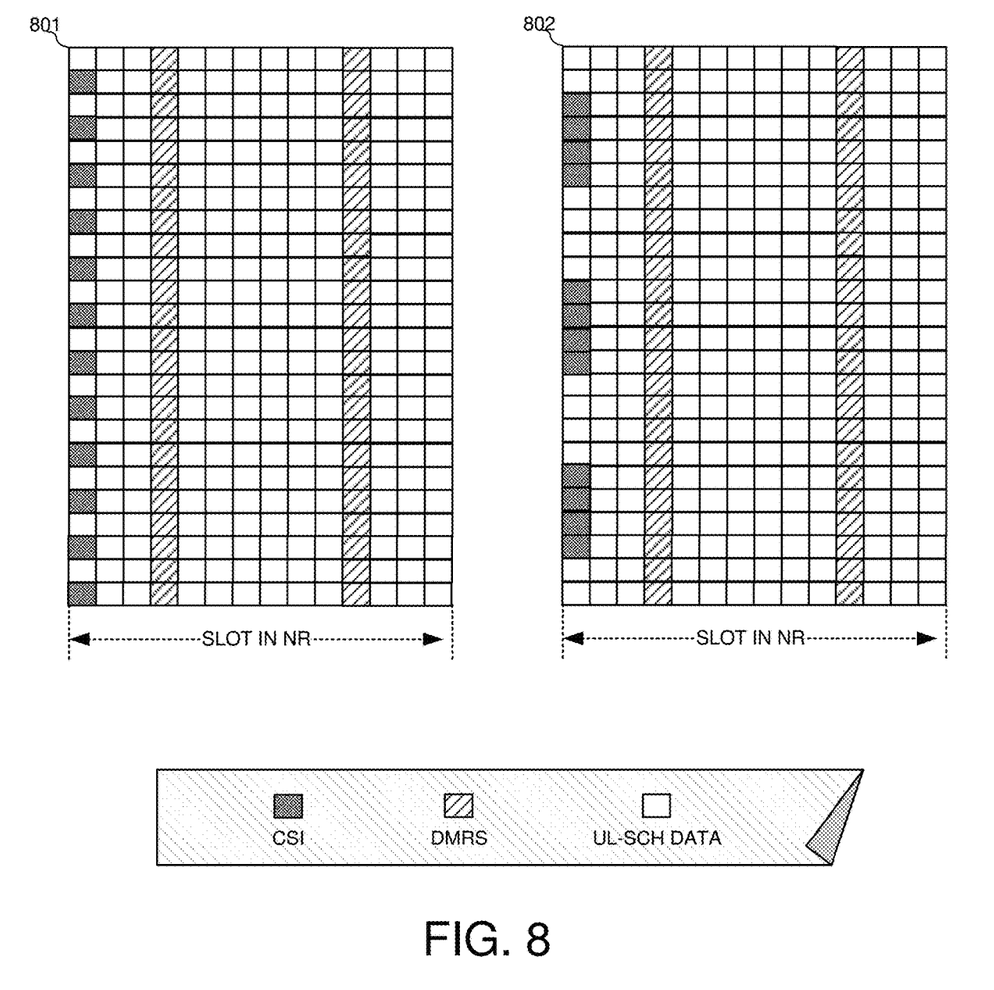
FIG. 8 illustrates exemplary diagrams for CSI RE allocation with frequency diversity in accordance with embodiments of the current invention.

FIG. 8 illustrates exemplary diagrams for CSI RE allocation with frequency diversity in accordance with embodiments of the current invention. The CSI rate-matches other information rather than puncturing. Therefore, there is no need to spread in time as much as possible. Frequency diversity is preferred. Diagrams 801 and 802 illustrate two different frequency domain distribution pattern for CSI RE allocation. The CSI REs should be distributed in the frequency domain as much as possible.

Figure 9:
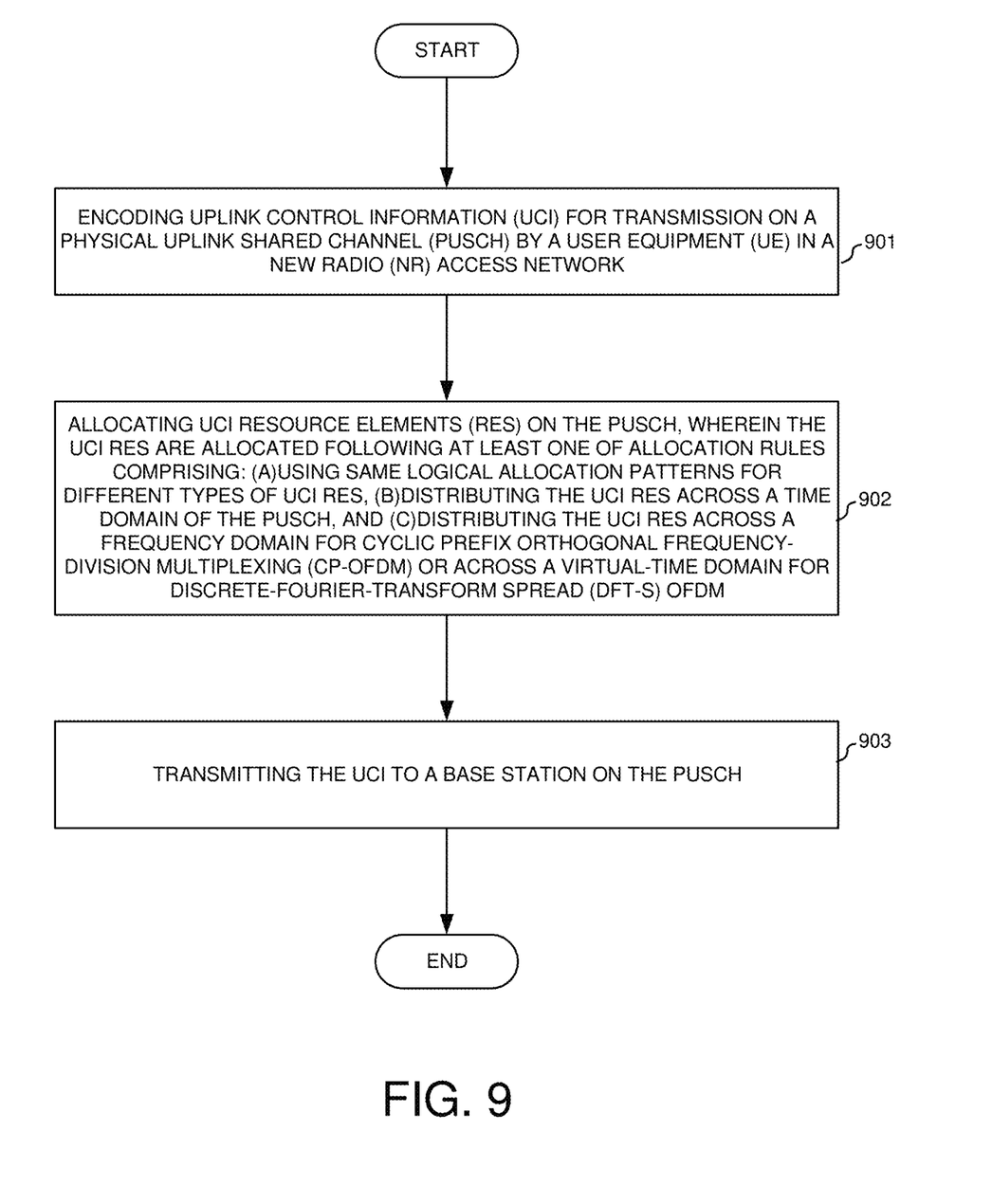
FIG. 9 illustrates an exemplary flow chart for the UE to transmit the UCI REs on the PUSCH channel in accordance with embodiments of the current invention.

FIG. 9 illustrates an exemplary flow chart for the UE to transmit the UCI REs on the PUSCH channel in accordance with embodiments of the current invention. At step 901, the UE encodes UCI for transmission on a PUSCH in an NR network. At step 902, the UE allocates UCI REs on the PUSCH, wherein the UCI REs are allocated following at least one of allocation rules comprising: (a) using same logical allocation patterns for both CP-OFDM waveforms and DFT-S-OFDM waveforms, (b) distributing the UCI REs across a time domain of the PUSCH, and (c) distributing the UCI REs across a frequency domain for CP-OFDM or across a virtual-time domain for DFT-S-OFDM. At step 903, the UE transmits the UCI to a base station on the PUSCH.

Figure 10:
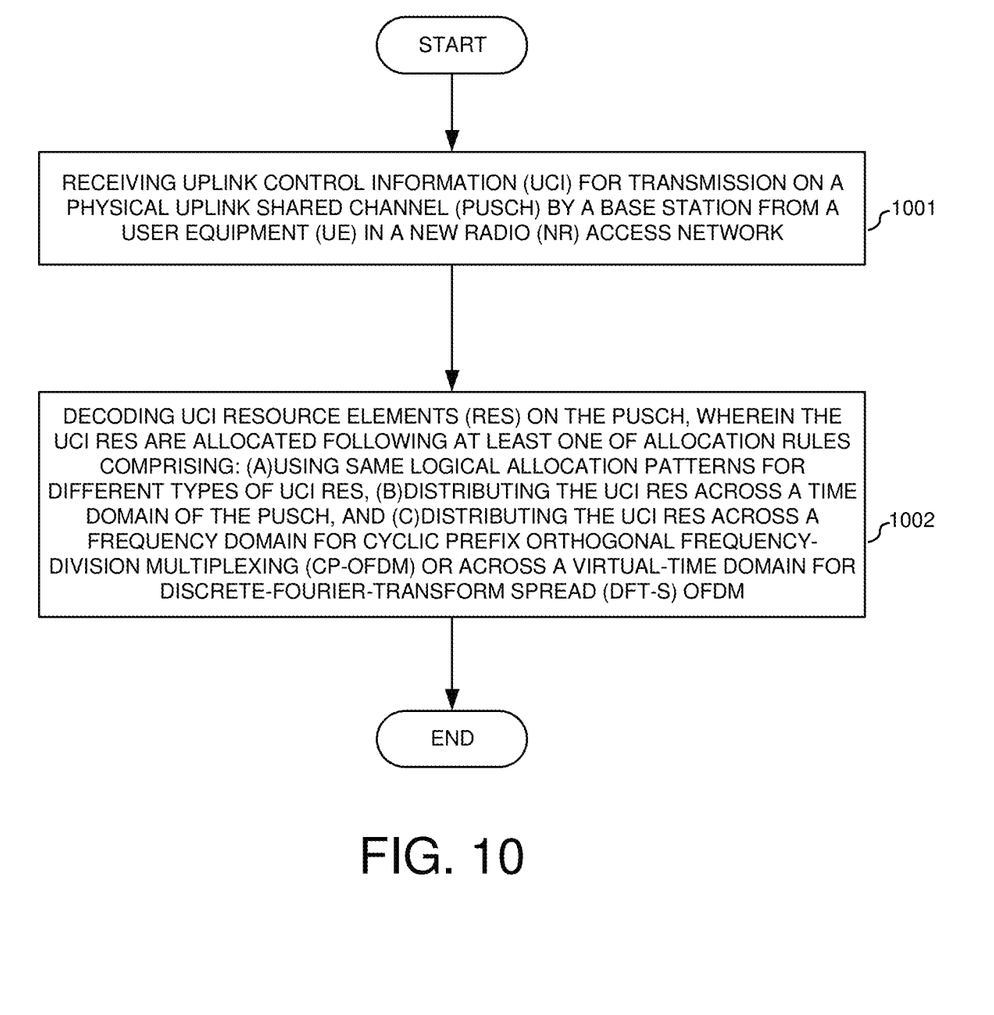
FIG. 10 illustrates an exemplary flow chart for the base station to receive the UCI REs on the PUSCH channel in accordance with embodiments of the current invention.

FIG. 10 illustrates an exemplary flow chart for the base station to receive the UCI REs on the PUSCH channel in accordance with embodiments of the current invention. At step 1001, the base station receives UCI for transmission on a PUSCH from an UE in a NR network. At step 1002, the base station decodes UCI REs on the PUSCH, wherein the UCI REs are allocated following at least one of allocation rules comprising: (a) using same logical allocation patterns for both CP-OFDM waveforms and DFT-S-OFDM waveforms, (b) distributing the UCI REs across a time domain of the PUSCH, and (c) distributing the UCI REs across a frequency domain for CP-OFDM or across a virtual-time domain for DFT-S-OFDM.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
encoding uplink control information (UCI) for transmission on a physical uplink shared channel (PUSCH) by a user equipment (UE) in a new radio (NR) access network;
allocating UCI resource elements (REs) on the PUSCH following one or more selected UCI allocation rules comprising: (a) using same logical allocation patterns for both cyclic prefix orthogonal frequency-division multiplexing (CP-OFDM) waveforms and Discrete-Fourier-Transform spread (DFT-S) OFDM waveforms, (b) distributing the UCI REs across a time domain of the PUSCH, and (c) distributing the UCI REs across a frequency domain for CP-OFDM waveforms or across a virtual-time domain for DFT-S-OFDM waveforms, and wherein the one or more UCI allocation rules are selected in allocating the UCI REs is based on a PUSCH code block allocation method, and wherein allocating the UCI REs is based on a number of OFDM symbols of the PUSCH, a number of subcarriers for the PUSCH, a weighting factor, and a number of information bits of uplink data, and wherein the weighting factor is obtained through system information from the NR access network; and
transmitting the UCI to a base station on the PUSCH.

2. The method of claim 1, wherein the UCI is hybrid automatic repeat request (HARQ) ACK, and wherein the UCI REs puncture or rate-match the PUSCH.

3. The method of claim 2, further comprising:
calculating a number of HARQ REs dynamically for the HARQ ACK;
generating encoded bits and subsequently modulated symbols based on the number of HARQ REs; and
allocating the modulated symbols on the UCI REs.

4. The method of claim 2, wherein UCI allocation rule (b) applies and equivalent number of subcarriers for the HARQ ACK are evenly distributed in frequency domain of the PUSCH.

5. The method of claim 4, wherein additional shift is applied for each OFDM symbol of the PUSCH.

6. The method of claim 1, wherein the UCI is a channel state information (CSI), and wherein UCI allocation rule (c) applies.

7. A method comprising:
receiving uplink control information (UCI) for transmission on a physical uplink shared channel (PUSCH) by a base station from a user equipment (UE) in a new radio (NR) access network; and
decoding UCI resource elements (REs) on the PUSCH, wherein the UCI REs are allocated following one or more selected UCI allocation rules comprising: (a) using same logical allocation patterns for both cyclic prefix orthogonal frequency-division multiplexing (CP-OFDM) waveforms and Discrete-Fourier-Transform spread (DFT-S) OFDM waveforms, (b) distributing the UCI REs across a time domain of the PUSCH, and (c) distributing the UCI REs across a frequency domain for CP-OFDM waveforms or across a virtual-time domain for DFT-S-OFDM waveforms, and wherein the one or more UCI allocation rules are selected in allocating the UCI REs is based on a PUSCH code block allocation method, and wherein allocating the UCI REs is based on a number of OFDM symbols of the PUSCH, a number of subcarriers for the PUSCH, a weighting factor, and a number of information bits of uplink data, and wherein the weighting factor is obtained through system information from the NR access network.

8. The method of claim 7, wherein the UCI is hybrid automatic repeat request (HARQ) ACK, wherein, the UCI REs puncture or rate-match the PUSCH.

9. The method of claim 8, wherein UCI allocation rule (b) applies and equivalent number of subcarriers for the HARQ ACK are evenly distributed in frequency domain of the PUSCH.

10. The method of claim 9, wherein additional shift is applied for each OFDM symbol of the PUSCH.

11. The method of claim 7, wherein the UCI is a channel state information (CSI), and wherein UCI allocation rule (c) applies.

12. An user equipment (UE), comprising:
a transceiver that transmits and receives radio frequency (RF) signals from one or more base stations (BS) in a new radio (NR) access network;
a memory; and
a processor coupled to the memory, the processor configured to encode UCI for transmission on a physical uplink shared channel (PUSCH); and
allocate UCI resource elements (REs) on the PUSCH, wherein the UCI REs are allocated following one or more selected UCI allocation rules comprising: (a) using same logical allocation patterns for both cyclic prefix orthogonal frequency-division multiplexing (CP-OFDM) waveforms and Discrete-Fourier-Transform spread (DFT-S) OFDM waveforms, (b) distributing the UCI REs across a time domain of the PUSCH, and (c) distributing the UCI REs across a frequency domain for CP-OFDM waveforms or across a virtual-time domain for DFT-S-OFDM waveforms, and wherein the one or more UCI allocation rules are selected in allocating the UCI REs is based on a PUSCH code block allocation method, and wherein allocating the UCI REs is based on a number of OFDM symbols of the PUSCH, a number of subcarriers for the PUSCH, a weighting factor, and a number of information bits of uplink data, and wherein the weighting factor is obtained through system information from the NR access network.

13. The UE of claim 12, wherein the UCI is hybrid automatic repeat request (HARQ) ACK, wherein the UCI REs puncture or rate-match the PUSCH.

14. The UE of claim 13, further comprising:
a HARQ REs generator that calculates a number of HARQ REs dynamically for the HARQ ACK, generates encoded bits and subsequently modulated symbols based on the number of HARQ REs, and allocates the modulated symbols on the UCI REs.

15. The UE of claim 13, wherein UCI allocation rule (b) applies and equivalent number of subcarriers for the HARQ ACK are evenly distributed in frequency domain of the PUSCH.

16. The UE of claim 15, wherein additional shift is applied for each OFDM symbol of the PUSCH.

17. The UE of claim 12, wherein the UCI is a channel state information (CSI), and wherein UCI allocation rule (c) applies.

\* \* \* \* \*